(12) United States Patent
Krahn et al.

(10) Patent No.: US 9,505,955 B1
(45) Date of Patent: Nov. 29, 2016

(54) ELECTRO-DRY ADHESION

(71) Applicants: Jeffrey M. Krahn, Coquitlam (CA); Carlo Menon, Coquitlam (CA)

(72) Inventors: Jeffrey M. Krahn, Coquitlam (CA); Carlo Menon, Coquitlam (CA)

( * ) Notice: Subject to any disclaimer, the term of this patent is extended or adjusted under 35 U.S.C. 154(b) by 0 days.

(21) Appl. No.: 14/198,580

(22) Filed: Mar. 5, 2014

Related U.S. Application Data

(60) Provisional application No. 61/772,599, filed on Mar. 5, 2013.

(51) Int. Cl.
*B32B 3/10* (2006.01)
*C09J 9/02* (2006.01)
*H01B 13/00* (2006.01)
*H01B 1/24* (2006.01)
*H01B 1/22* (2006.01)

(52) U.S. Cl.
CPC . *C09J 9/02* (2013.01); *H01B 1/22* (2013.01); *H01B 1/24* (2013.01); *H01B 13/00* (2013.01)

(58) Field of Classification Search
CPC .............................. A44B 18/0076; C09J 9/02

USPC .......................................................... 428/100
See application file for complete search history.

(56) References Cited

U.S. PATENT DOCUMENTS

| 2008/0280085 | A1* | 11/2008 | Livne | ........................ | C09J 7/02 428/40.1 |
| 2011/0117321 | A1* | 5/2011 | Menon | ................ | B29C 33/3878 428/156 |
| 2013/0202865 | A1* | 8/2013 | Choi | ....................... | H05K 9/009 428/216 |

* cited by examiner

*Primary Examiner* — Brent O'Hern
(74) *Attorney, Agent, or Firm* — Kafantaris Law Offices; Theo Kafantaris

(57) ABSTRACT

The present invention will provide adhesive technology adapted to adhere indefinitely to a surface without leaving a residue or sticky mess after removal. The self-preloading force provided by the electrostatic adhesion enables the present invention to be used in applications where directly applying a preload is not possible. Furthermore, the combination of electrostatic forces and Van der Waals forces allows electro-dry-adhesives to adhere to surfaces where traditional dry adhesives and electrostatic devices fail.

10 Claims, 16 Drawing Sheets

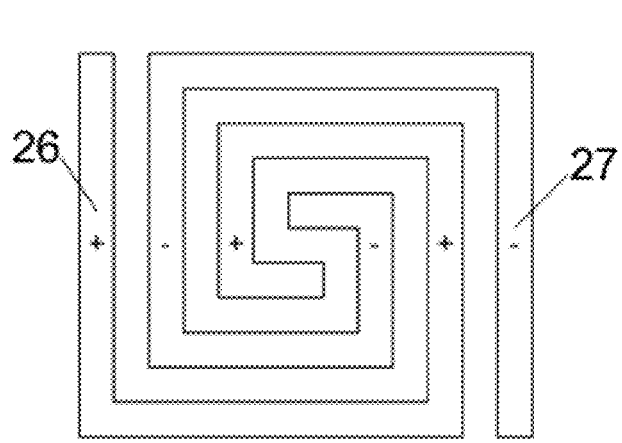
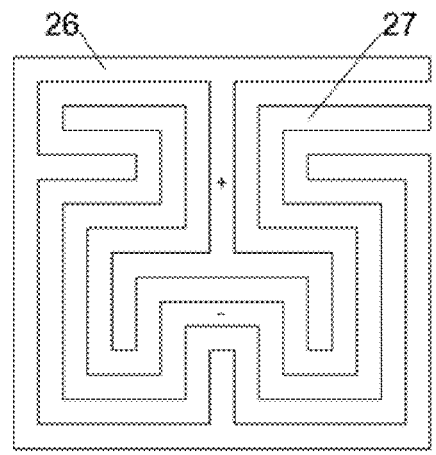
FIG. 54
FIG. 55
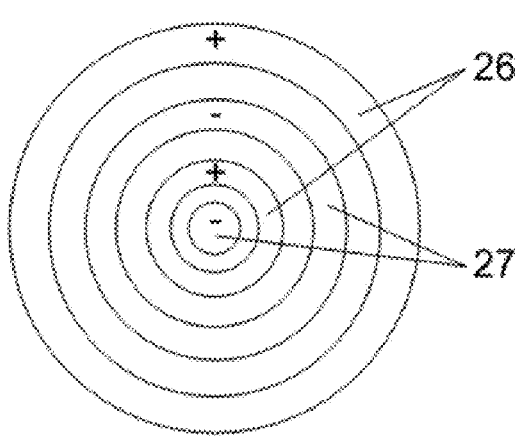
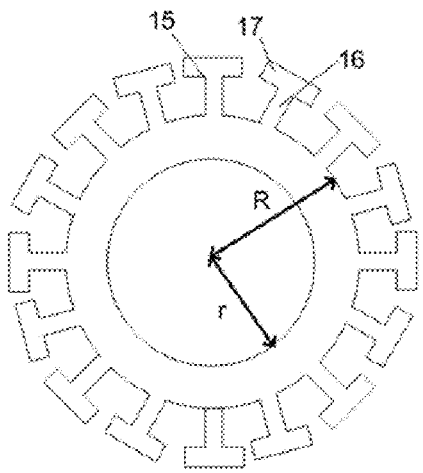
FIG. 56
FIG. 57

ELECTRO-DRY ADHESION

CROSS-REFERENCE TO RELATED APPLICATIONS

This application claims the benefit of U.S. Provisional Patent Application No. 61/772,599, filed on Mar. 5, 2013, and incorporated herein by reference.

STATEMENT REGARDING FEDERALLY SPONSORED RESEARCH AND DEVELOPMENT

Not Applicable.

FIELD OF THE INVENTION

This invention relates generally to dry and electrostatic adhesion, and more particularly, to a dry adhesion apparatus that is adapted to self-preload onto a target surface using electrostatic adhesion.

DISCUSSION OF RELATED ART

Generally, adhesion describes the attraction between two dissimilar surfaces or objects.

Wet adhesion can be described as adhering two objects through the use of a compound or substance, such as glue or paste. Electrostatic adhesion can be described as adhering two objects using electrical charges. Electrostatic adhesion typically incorporates electrodes having opposing polarity, from which the objects will be attracted to each other. Dry adhesion can be described as adhering two objects without the use of any liquid or surface tension, but rather, through van der Waal's forces.

Dry adhesives are inspired by the fibrillar structures found on geckos and some spiders which rely mainly on van der Waals; forces for adhesion. Dry adhesion is extremely unique, in that no composition or electrical requirements are necessary. One drawback of dry adhesives is that, in order to achieve optimal adhesion, often a relatively high preload is required. Generally, this is done by pushing the dry adhesive into the close contact necessary for van der Waals' interactions to occur by hand or using a mechanical device or actuator. Similarly, dry adhesives are often peeled from a surface by hand or by a mechanical device or actuator.

While wet adhesion is the most common method of adhering two dissimilar surfaces together, there is a continued need for a device which can temporarily adhere two objects without leaving a sticky residue or requiring a constant power supply. Furthermore, there is a continued need for a device which can self-preload with respect to dry adhesion. The present invention satisfies these needs.

SUMMARY OF THE INVENTION

The present invention will provide a method and apparatus for adhering two dissimilar surfaces together without the need of a chemical composition, constant power, or initial preload. Furthermore, the present invention will not leave any residue behind, will easily attach and detach to a surface, and is adapted to self-clean if necessary. This is accomplished by combining the benefits of dry adhesion with those of electrostatic adhesion.

The present invention comprises a substrate material, a micro-featured and/or nano-scale featured surface, and conductive portion. These components work in conjunction to provide attractive or repulsive forces to permit a dry adhesive material to be self-preloaded, self-detached, or self-cleaned. More specifically, the generated electrostatic voltage produces an electrostatic field and either electrostatic adhesion forces or electrostatic repulsion forces depending on the polarity of the electrodes and the frequency with which it is applied.

When the present invention is placed near the surface of an object, the electrostatic forces either attract or repel an object based on the polarity of the objects intrinsic charge or the objects ability to reorganize surface charges into a dipole or charge regions that are either positively or negatively charged. Like charges generate repelling forces and opposing electrical charges generate attractive forces that are used by the present invention to either self-preload (attractive force), self-detach (repelling force), or self-clean (alternating attractive and repelling force). Electric control of the present invention can easily be switched on during self-preloading, self-detaching, or self-cleaning operations, but can be switched off to enable the present invention to operate in a low-power state using van der Waals and similar natural attraction forces.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DESCRIPTION OF THE DRAWINGS

FIG. 54 illustrates an alternative electrode arrangement of the present invention according to an alternative embodiment;

FIG. 55 illustrates an alternative electrode arrangement of the present invention according to an alternative embodiment;

FIG. 56 illustrates an alternative electrode arrangement of the present invention according to an alternative embodiment;

FIG. 57 is a cross-sectional view of the present invention illustrating an outward radial embodiment;

DETAILED DESCRIPTION OF THE PREFERRED EMBODIMENT

Figure 1:
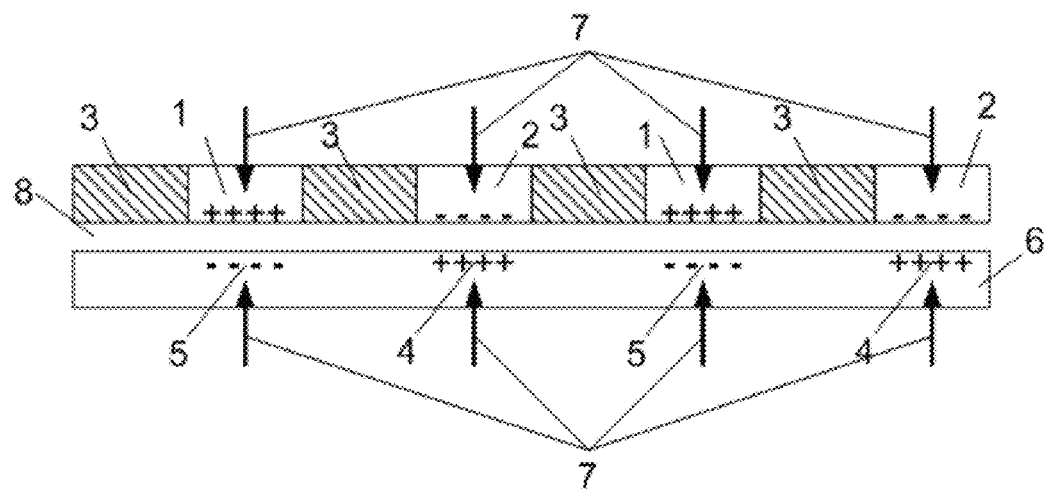
FIG. 1 is a cross-sectional view of the present invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

In the preferred embodiment, the present invention comprises a micro-structured and/or nano-structured surface further comprising a deformable material 6, in general, a conductive polymer, rubber or silicone rubber or a composite polymer, rubber, or silicone rubber material with embedded conductive particles 21 such as carbon black, carbon nanotubes, silver particles, or other conductive materials, and one electrode. The electrode may be composed of an electrically conductive metallic material or an electrically conductive polymer, rubber, or silicone rubber. Alternatively the electrode may be composed of a composite polymer, rubber, or silicon rubber with embedded conductive particles 21 such as carbon black, carbon nanotubes, silver particles, or other conductive materials which enable a current or electric charge to pass through the polymer, rubber, or silicon rubber material.

A voltage of at least about 500V is applied to the electrode which generates an electrostatic field attracting to or repulsing the electro-dry-adhesive from the surface to which is attached. Preloading of the present invention occurs when the electrostatic field is attractive. Reduced dry adhesion occurs when the electrostatic field is repulsive. After preloading occurs, the voltage may remain active to provide enhanced adhesion, or the voltage may be disabled to conserve power while the present invention relies on van der Waals' forces for continued adhesion. Self-peeling or reduced adhesion aiding peeling occurs while a repelling electrostatic field is present. The applied voltage may be either constant or varying.

In an alternative embodiment, the present invention comprises the micro-structured and/or nano-structured surface and deformable material 6 of the preferred embodiment, and further comprises a plurality of electrodes. The electrodes may be composed of an electrically conductive metallic material or an electrically conductive polymer, rubber, or silicone rubber. Alternatively the electrodes may be composed of a composite polymer, rubber, or silicon rubber with embedded conductive particles such as carbon black, carbon nanotubes, silver particles, or other conductive materials which enable a current or electric charge to pass through the polymer, rubber or silicon rubber material. The plurality of electrodes are separated by a sufficient distance to prevent leakage currents or arcing between the electrodes and the gap between electrodes may be composed of air or a gas, liquid, or solid material.

Again, a voltage of at least about 500V is applied across the electrodes in such a manner that the voltage difference between electrodes is at least about 500V, which generates an electrostatic field attracting to or repulsing the electro-dry-adhesive from the surface to which it is attached. Preloading of the dry adhesive structures occurs when the electrostatic field is attractive. Reduced dry adhesion occurs when the electrostatic field is repulsive. After preloading occurs, the voltage may remain active to provide enhanced adhesion or the voltage may be disabled to conserve power while present invention relies on van der Waals' forces for continued adhesion. Self-peeling or reduced adhesion aiding peeling occurs while a repelling electrostatic field is present. The applied voltage may be either constant or varying.

The present invention may be further adapted for self-cleaning Here, a voltage of at least about 500V is applied across the electrode or electrodes in such a manner that the voltage difference between electrodes is at least about 500V, which generates an electrostatic field attracting or repulsing any dirt, grease or fluids on the micro-structured and/or nano-structured surface of the present invention depending on the surface charge of the dirt, grease or fluid. The applied voltage may be of constant or varying amplitude and/or frequency and may be applied in such a manner as to direct any dust, grease or fluid towards the extremities of the present invention.

The present invention is manufactured such that the components work in conjunction to provide adequate dry and electrostatic adhesion. The method of manufacturing the present invention comprises first applying one or more layers of photoresistive material to a poly(methyl methacrylate) mold substrate, glass, silicon, or other suitable mold substrate. Next, the photoresistive material is patterned and developed to form a structured array of holes or posts which form the structure of the mold. Multiple layers of photoresists may be used to create holes with layers of varying diameter. A conductive silicone rubber material, conductive flexible polymer material, silicone rubber material containing conductive particles, or a flexible polymer containing conductive particles is positioned within the mold to form the electro-dry-adhesive electrodes. Next, a conductive silicone rubber material, conductive flexible polymer material, silicone rubber material containing conductive particles, or a flexible polymer containing conductive particles or other conductive material such as aluminum may be attached or incorporated into the electro-dry-adhesive as an electrical contact.

In an alternative method of manufacture, the non-conductive silicone rubber material or flexible polymer material is used to form the structured surface of the present invention. Here, a layer of conductive material such as gold, chromium, aluminum, conductive silicone rubber material, conductive flexible polymer material, silicone rubber material containing conductive particles, or a flexible polymer containing conductive particles is applied as an electrode layer to the unstructured side of the electro-dry-adhesive device. In a further alternative embodiment, a second layer of non-conducting material may be applied to the previously applied conducting layer to act as an insulating layer.

FIG. 1 illustrates the concept of electrostatic forces where the positive 1 and negative 2 electrodes are separated by an insulating material 3. When an electric potential is applied across the electrodes, a positive 4 or negative 5 charge, opposite to that on the nearest positive 1 or negative 2 electrode, is formed on the surface of the substrate material 6 the electro-dry-adhesives are being attached to. The positive 4 and negative 5 charged regions of the substrate 6 are attracted to the positive 1 or negative 2 charged electrodes and the generated electrostatic forces draw the charged electrodes and the substrate material together as indicated by the arrows 7. In this case, the positive 1 and negative 2 electrodes should be a conductive material to form the electrodes. The insulating material 3 could be air if sufficient space between the electrodes is maintained or a solid with an appropriate dielectric constant. The substrate material 6 in this case should be an insulating material. The substrate material 6 and the electro-dry-adhesive are separated by an air or liquid interface 8.

Figure 2:
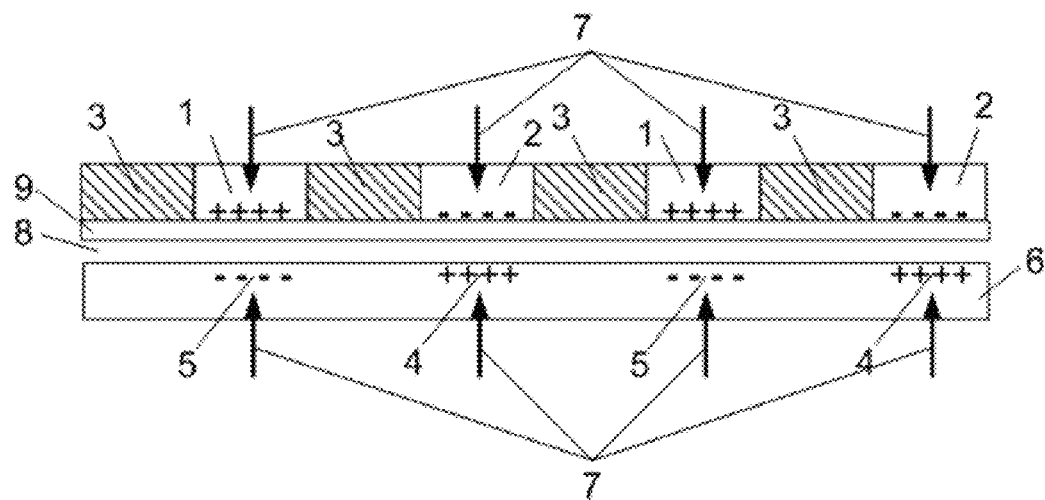
FIG. 2 is a cross-sectional view of the present invention with insulating layer.

FIG. 2 illustrates an alternative embodiment where the positive 1 and negative 2 electrodes are separated from each other by an insulating material 3 and an insulating layer 9 is directly attached to the electrodes and separates the positive 1 and negative 2 electrodes from the substrate material 6 the electro-dry-adhesives are being attached to. When an electric potential is applied across the positive 1 and negative 2 electrodes, a positive 4 or negative 5 charge, opposite to that on the nearest positive 1 or negative 2 electrode, is formed on the surface of the substrate material 6. The positive 4 and negative 5 charged regions of the substrate material 6 are attracted to the oppositely charged positive 1 and negative 2 electrodes and the generated electrostatic forces draw the charged electrodes and the substrate material together as indicated by the arrows 7. In this case, the positive 1 and negative 2 electrodes should be a conductive material to allow current to flow. The insulating material 3 should be in general an insulating material with high dielectric constant but could simply be air if sufficient space between the electrodes is maintained. The layer of material 9 separating the positive 1 and negative 2 electrodes from the substrate 6 in this case should be an insulating material.

The substrate material 6 can be either a nonconductive or a conductive material. When the substrate material 6 is a conductive material, the generated electrostatic force may be greater. The substrate material 6 and the present invention are separated by an air or liquid interface 8.

Figure 3:
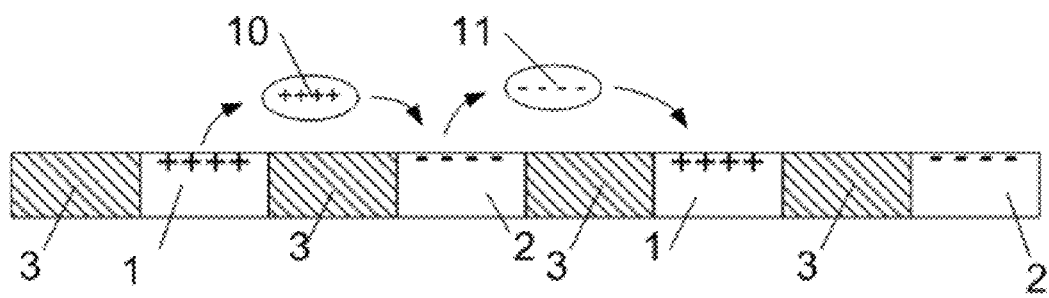
FIG. 3 is a cross-sectional view of the present invention configured for self-cleaning.

FIG. 3 illustrates the present invention configured for self-cleaning Positive 1 and negative 2 electrodes are separated by an insulating material 3. When a voltage is applied across the positive 1 and negative 2 electrodes positively 10 and negatively 11 charged electrodes dust, dirt, grease or fluids are repelled from the like-charged positive 1 and negative 2 electrodes and attracted towards the oppositely charged negative 2 and positive 1 electrodes respectively. The polarity of the positive 1 and negative 2 electrodes is reversed or applied in such a manner that the dust, dirt, grease or fluids are directed towards the edge of the present invention. The voltage applied to the positive 1 and negative 2 electrodes may be of constant or alternating polarity.

Figure 4:
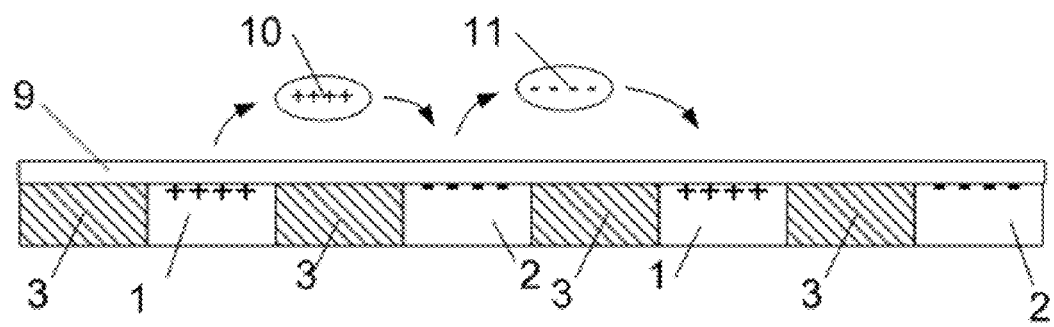
FIG. 4 is a cross-sectional view of the present invention configured for self-cleaning with insulating layer.

FIG. 4 shows the present invention configured for self-cleaning Positive 1 and negative 2 electrodes are separated by an insulating material 3. A layer of insulating material 9 separates the electrodes from the dirt particles. When a voltage is applied across the positive 1 and negative 2 electrodes positively 10 and negatively 11 charged electrodes dust, dirt, grease or fluids are repelled form the like-charged positive 1 and negative 2 electrodes and attracted towards the oppositely charged negative 2 and positive 1 electrodes respectively. The polarity of the positive 1 and negative 2 electrodes is reversed or applied in such a manner that the dust, dirt, grease or fluids are directed towards the edge of the present invention. The voltage applied to the positive 1 and negative 2 electrodes may be constant or alternating polarity.

Figure 5:
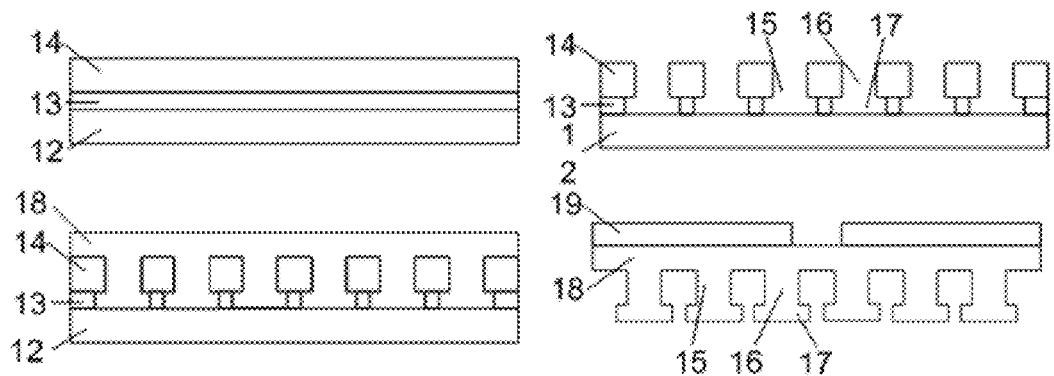
FIG. 5 is a schematic view of the fabrication process of the present invention.

FIG. 5 illustrates a schematic view of one fabrication process of the present invention. First, a Polymethyl Methacrylate (PMMA) wafer 12 is coated with first a layer of polydimethylglutarimide (PMGI) 13 and then a layer of AZ 9260 photoresist 14. Next, the PMGI 13 and AZ9260 14 photoresist is exposed to suitable UV light and developed in a suitable developing solution to create a mold cavity for the desired surface features 15 which may in this case include a post 16 and overhanging mushroom-like cap 17. Next, uncured Poly(Dimethyl Siloxane) (PDMS) 18 is mixed and cast on the mold in order to replicate the surface features. Lastly, the PDMS 18 is cured and then demolded from the mold with the desired features 15 such as a post 16 and overhanging cap 17. Conducting electrodes 19 are adhered to the unstructured surface of the PDMS to finalize the present invention.

Figure 6:
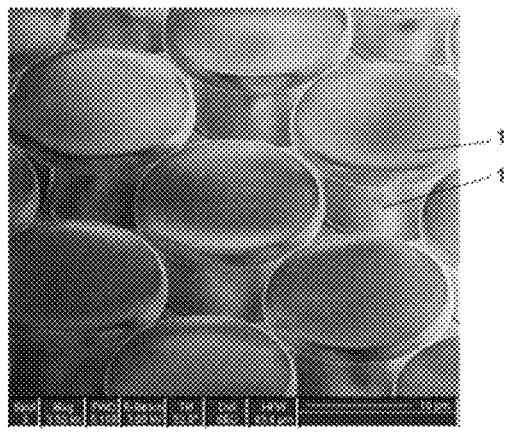
FIG. 6 is a scanning electron microscope image of one embodiment of the present invention.
Figure 7:
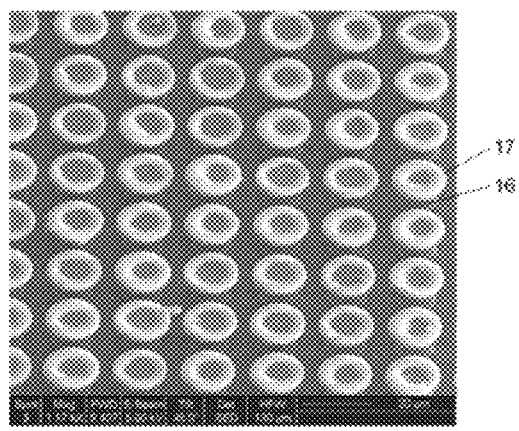
FIG. 7 is a scanning electron microscope image of an alternative embodiment of the present invention.
Figure 8:
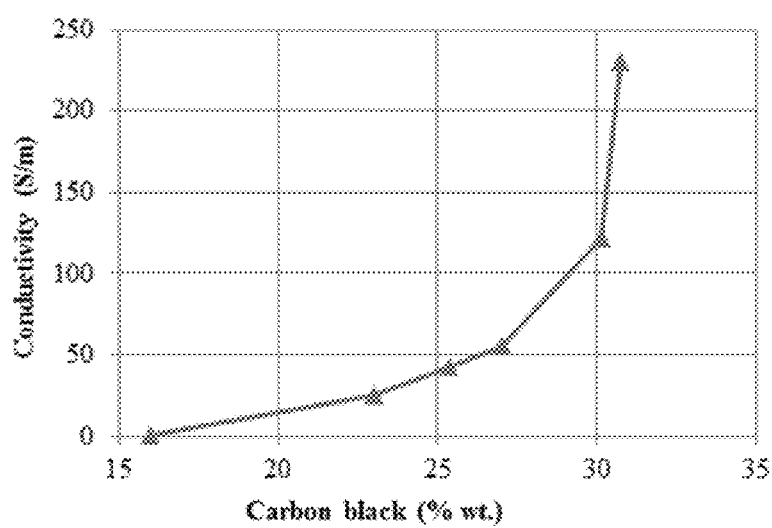
FIG. 8 is a graph illustrating an increase in conductivity as the percentage by weight of carbon black is added.
Figure 9:
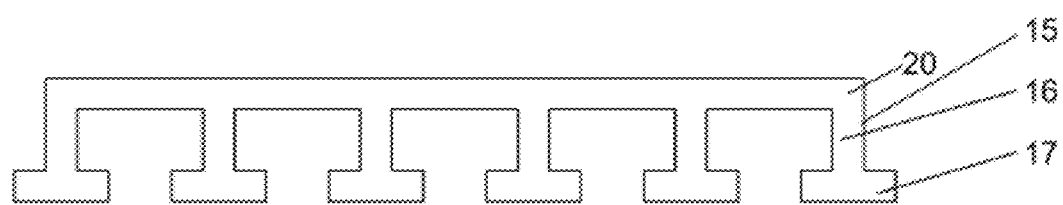
FIG. 9 is a cross-sectional view of the present invention illustrating micro-scale features.

FIGS. 6 and 7 are scanning electron microscope (SEM) images of alternative embodiments of the present invention showing the posts 16 and overhanging mushroom-like caps 17. FIG. 8 indicates the increase in conductivity of the PDMS as an increasingly larger percentage by weight of carbon black is added to the PDMS FIG. 9 illustrates an embodiment of the present invention where a non-conductive polymer or silicone rubber material 20 is used to define the micro-scale surface features 15 of the present invention which include a supporting post 16 and overhanging cap 17.

Figure 10:
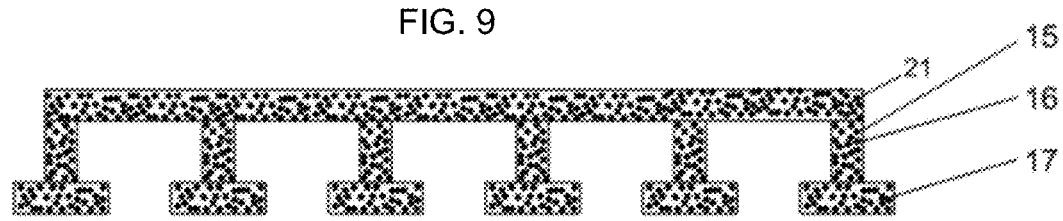
FIG. 10 is a cross-sectional view of the present invention illustrating micro-scale features with carbon black particles.

FIG. 10 illustrates an embodiment of the present invention where conductive carbon black particles 21 have been added to the polymer or silicone rubber 20 which is used to define the micro-scale surface features 15 of the present invention which include a supporting post 16 and overhanging cap 17.

Figure 11:
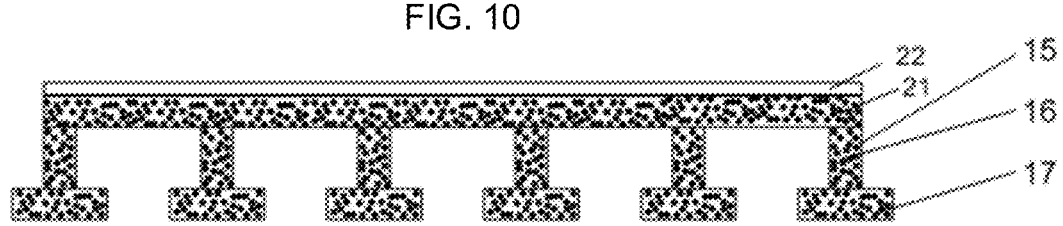
FIG. 11 is a cross-sectional view of the present invention illustrating micro-scale features with carbon black particles and a conducting electrode layer.

FIG. 11 illustrates yet another embodiment of the cross-section of the present invention where a conductive material or a polymer or silicon rubber which contains a sufficient number of conductive particles 21 and defines the micro-scale surface features 15 of the present invention which include a supporting post 16 and overhanging cap 17. A conducting electrode layer 22 is used to enhance the electrical contact between the polymer or silicone rubber material 21 and the power source.

Figure 12:
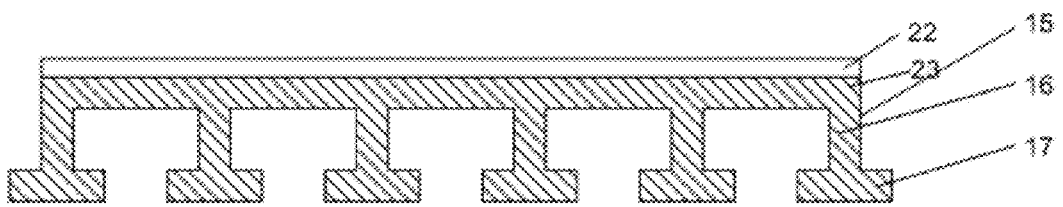
FIG. 12 is a cross-sectional view of the present invention illustrating micro-scale features with a conducting electrode layer.

FIG. 12 illustrates yet another embodiment of the cross-section of the present invention where a layer of non-conducting material 23 or silicon rubber or polymer defines the micro-scale surface features 15 which include a supporting post 16 and an overhanging cap 17. A layer of conducting material 22 is used to define the electrodes and is attached directly to the non-conducting material 23.

Figure 13:
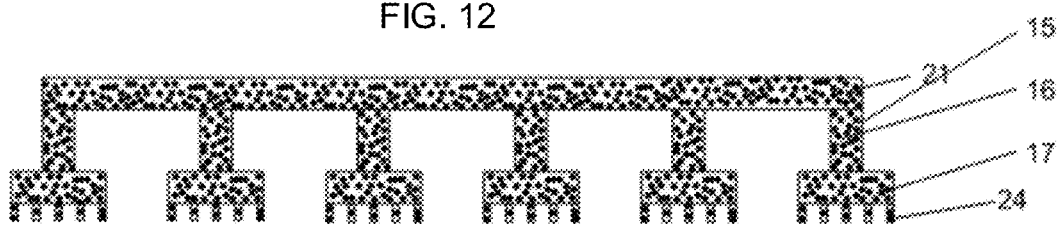
FIG. 13 is a cross-sectional view of the present invention illustrating micro-scale and nano-scale features with carbon black particles.

FIG. 13 illustrates yet another embodiment of the cross-section of the present invention where a conductive material or a polymer or silicon rubber which contains a sufficient number of conductive particles 21 and defines the micro-scale surface features 15 of the present invention which include a supporting post 16 and overhanging cap 17. A nano-scale layer of the dry adhesive structure 24 cover the overhanging cap 17 of the micro-scale. The conducting polymer or silicone rubber material 21 defines both micro-scale and nano-scale surface features of the present invention.

Figure 14:
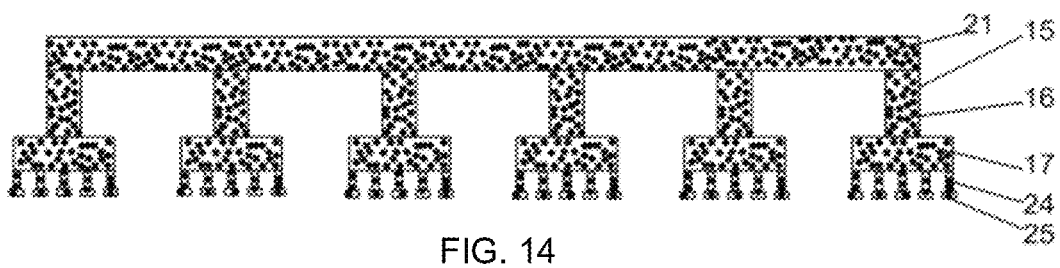
FIG. 14 is a cross-sectional view of the present invention illustrating micro-scale and nano-scale features with carbon black particles.

FIG. 14 illustrates yet another embodiment of the cross-section of the present invention where a conductive material or a polymer or silicon rubber which contains a sufficient number of conductive particles 21 and defines the micro-scale surface features 15 of the present invention which include a supporting post 16 and overhanging cap 17. A nano-scale layer of dry adhesive structures 24 with overhanging caps 25 cover the overhanging cap 17 of the micros-scale. The conducting polymer or silicone rubber material 21 defines both micro-scale and nano-scale surface features of the present invention.

Figure 15:
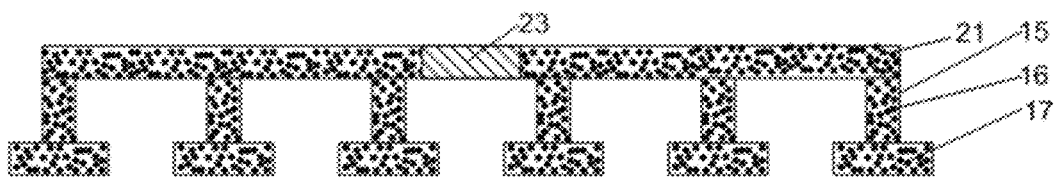
FIG. 15 is a cross-sectional view of the present invention illustrating micro-scale features with carbon black particles separated by a non-conducting material.

FIG. 15 illustrates yet another embodiment of the cross-section of the present invention where a conducting material or a polymer, silicon rubber or plastic material 21 in which conductive particles have been added to increase the conductivity of the material defines the surface features 15 of the present invention which includes a supporting post 16 and overhanging cap 17. Areas made with a conducting material or a polymer, silicon rubber or plastic material 21 are separated by a non-conducting silicon rubber, polymer or plastic material 23 and operate to isolate the regions made from a conducting material or a polymer, silicon rubber or plastic material 21 from each other.

Figure 16:
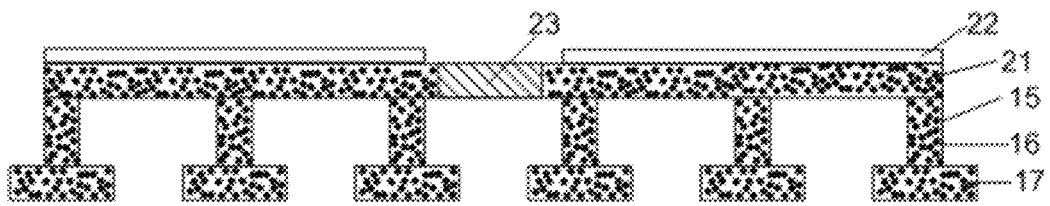
FIG. 16 is a cross-sectional view of the present invention illustrating micro-scale features with carbon black particles and a conducting electrode layer separated by a non-conducting material.

FIG. 16 indicates yet another embodiment of the cross-section of the present invention where 3 different materials have been used to fabricate the device. In this case, a conductive polymer, silicone rubber or plastic or a polymer, silicone rubber or plastic material that has been made conductive by the addition of an appropriate amount of conductive particles 21 defines the micro-scale features 15 composed of a supporting post 16 and an overhanging cap 17. A conductive material 22 improves conductivity or electrical contact to the conductive polymer, silicone rubber or plastic material 21. A third nonconductive layer of material 23 such as silicone rubber, polymer or plastic is used to electrically isolate conductive regions on the present invention.

Figure 17:
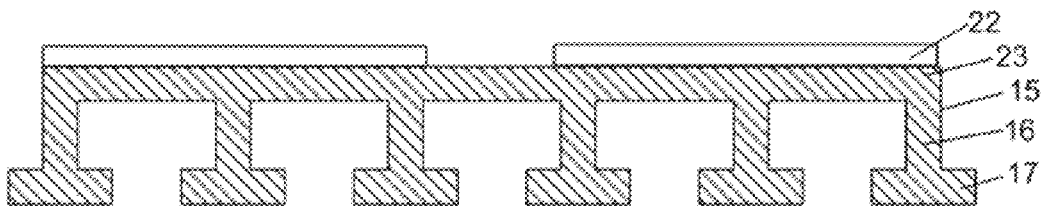
FIG. 17 is a cross-sectional view of the present invention illustrating micro-scale features with a separated conducting electrode layer.

FIG. 17 indicates yet another embodiment of the cross-section of the present invention where 2 materials have been used to fabricate the device. A nonconductive polymer, silicone rubber or plastic material 23 defines the micro-scale features 15 which include a supporting post 16 and overhanging cap 17. A conductive material 22 such as silicone rubber, polymer or plastic or a polymer, silicone rubber or plastic material that has been made conductive by the addition of an appropriate amount of conductive particles or a metal layer defines the electrical electrodes of the present invention.

Figure 18:
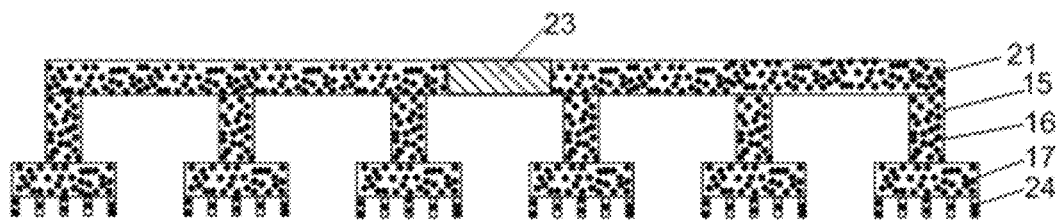
FIG. 18 is a cross-sectional view of the present invention illustrating micro-scale and nano-scale features with carbon black particles and a conducting electrode layer separated by a non-conducting material.

FIG. 18 illustrates yet another embodiment of the cross-section of the present invention where a hierarchy of micro-scale 15 and nano-scale 24 structures is used to enhance adhesion. A conducting polymer or silicone rubber material 21 defines the micros-scale features 15 which includes a supporting post 16 and overhanging cap 17 as well as the nano-scale features 24 of the present invention. The conducting polymer or silicone rubber material 21 are separated by a silicone rubber, polymer or plastic material 23 which is non-conducting and operates as an insulating region between the conducting regions of the present invention.

Figure 19:
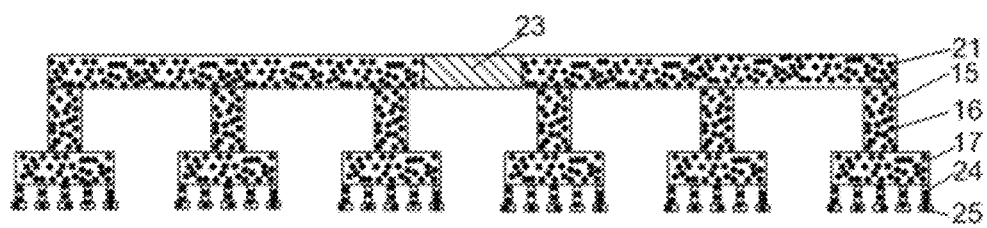
FIG. 19 is a cross-sectional view of the present invention illustrating micro-scale and nano-scale features with carbon black particles and a conducting electrode layer separated by a non-conducting material.

FIG. 19 illustrates yet another embodiment of the cross-section of the present invention where a hierarchy of micro-scale 15 and nano-scale 24 structures is used to enhance adhesion. A conducting polymer or silicone rubber material 21 defines the micros-scale features 15 which includes a supporting post 16 and overhanging cap 17 as well as the nano-scale features 24 with overhanging caps 25 of the present invention. The conducting polymer or silicone rubber material 21 are separated by a silicone rubber, polymer or plastic material 23 which is non-conducting and act as an insulating region between the conducting regions of the present invention.

Figure 20:
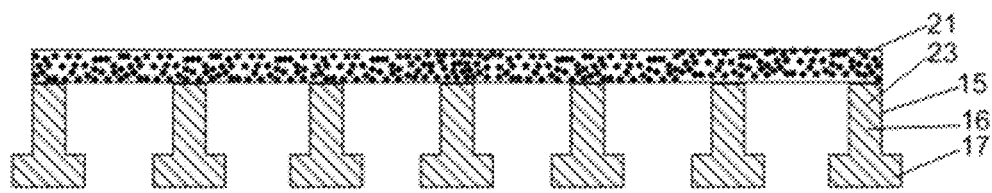
FIG. 20 is a cross-sectional view of the present invention illustrating micro-scale features without carbon black particles.
Figure 21:
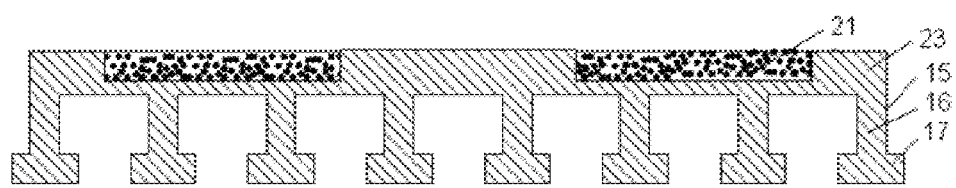
FIG. 21 is a cross-sectional view of the present invention illustrating micro-scale features without carbon black particles, wherein the carbon black particles are separated.

FIG. 20 illustrates yet another embodiment of the cross-section of the present invention where the surface features 15 with supporting post 16 and overhanging cap 17 are made from non-conducting silicon rubber, polymer or plastic 23 and the backing layer is made from a layer of conducting silicone rubber, polymer or plastic material 21. FIG. 21 illustrates yet another embodiment of the cross-section of the present invention where a structured interlacing electrode pattern has been defined using conductive polymers, silicon rubber or plastic 21. The micro-structures 15 on the surface of the present invention have a supporting post 16 and overhanging cap 17 which is formed from non-conducting silicon rubber, polymer or plastic material 23.

Figure 22:
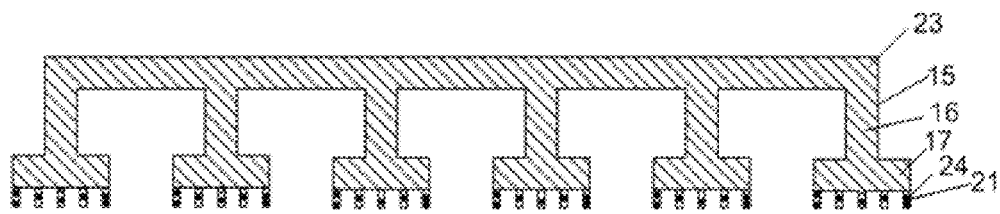
FIG. 22 is a cross-sectional view of the present invention illustrating micro-scale and nano-scale features with carbon black particles in the nano-scale features.

FIG. 22 illustrates yet another embodiment of the cross-section of the present invention where the micro-scale surface features 15 with supporting post 16 and overhanging cap 17 are fabricated from non-conducting silicon rubber, polymer or plastic material 23 and the nano-scale features 24 are made from conducting material 21.

Figure 23:
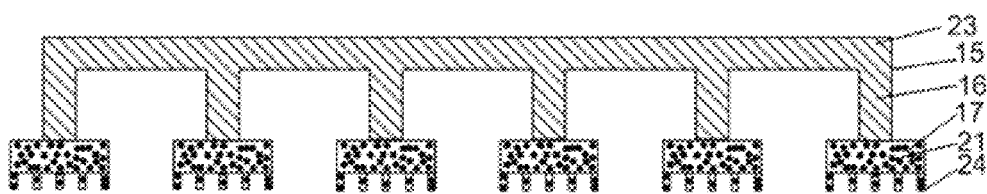
FIG. 23 is a cross-sectional view of the present invention illustrating micro-scale and nano-scale features with carbon black particles in the nano-scale features.

FIG. 23 illustrates yet another embodiment of the cross-section of the present invention where the present invention micro-scale 15 and nano-scale 24 features are made of either a conducting 21 or non-conducting 23 polymer or silicone rubber material. The non-conducting polymer or silicone rubber material 23 defines the backing layer and micro-scale post 16. The overhanging cap 17 of the micros-scale features 15 and nano-scale features 24 are made from a conducting polymer or silicone rubber material 21.

Figure 24:
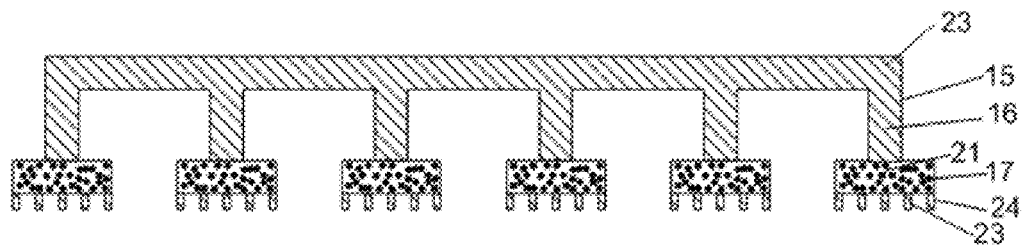
FIG. 24 is a cross-sectional view of the present invention illustrating micro-scale and nano-scale features with carbon black particles in the nano-scale features.

FIG. 24 illustrates yet another embodiment of the cross-section of the present invention where the present invention micro-scale 15 and nano-scale 24 features are made of either a conducting 21 or non-conducting 23 polymer or silicone rubber material. The non-conducting polymer or silicone rubber material 23 defines the supporting post 16 of the micros-scale features 15 and the nano-scale features 24. A conducting polymer or silicone rubber material 21 defines the micro-scale overhanging cap 17.

Figure 25:
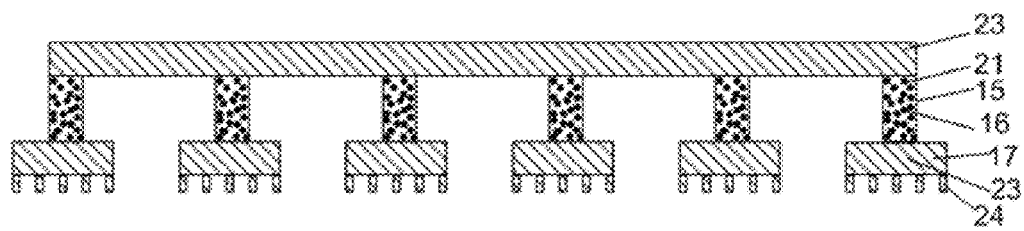
FIG. 25 is a cross-sectional view of the present invention illustrating micro-scale and nano-scale features with carbon black particles in the micro-scale posts.

FIG. 25 illustrates yet another embodiment of the cross-section of the present invention where the present invention micro-scale 15 and nano-scale 24 features are made of either a conducting 21 or non-conducting 23 polymer or silicone rubber material. The non-conducting polymer or silicone rubber material 23 defines the backing layer, overhanging cap 17 of the micros-scale features 15 and the nano-scale features 24. A conducting polymer or silicone rubber material 21 defines the micro-scale supporting post 16

Figure 26:
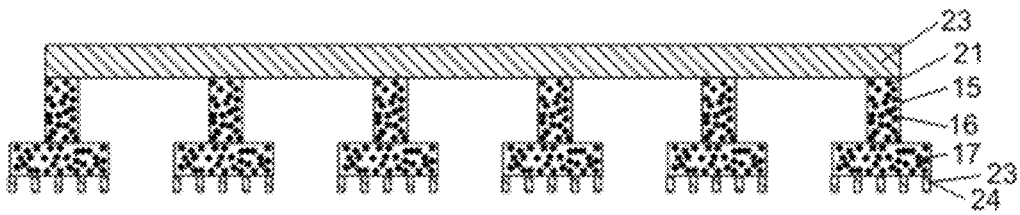
FIG. 26 is a cross-sectional view of the present invention illustrating micro-scale and nano-scale features with carbon black particles in the micro-scale and not in the nano-scale features.

FIG. 26 illustrates yet another embodiment of the cross-section of the present invention where the present invention micro-scale 15 and nano-scale 24 features are made of either a conducting 21 or non-conducting 23 polymer or silicone rubber material. The non-conducting polymer or silicone rubber material 23 defines the nano-scale features 24 and the backing material. A conducting polymer or silicone rubber material 21 defines the micro-scale supporting post 16 and overhanging cap 17 of the micros-scale features 15.

Figure 27:
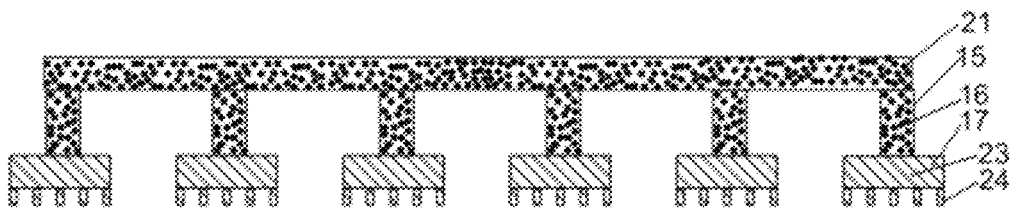
FIG. 27 is a cross-sectional view of the present invention illustrating micro-scale and nano-scale features with carbon black particles in the micro-scale posts and not in the nano-scale features.

FIG. 27 illustrates yet another embodiment of the cross-section of the present invention where the present invention micro-scale 15 and nano-scale 24 features are made of either a conducting 21 or non-conducting 23 polymer or silicone rubber material. The non-conducting polymer or silicone rubber material 23 defines the overhanging cap 17 of the micro-scale features 15 and the nano-scale features 24. A conducting polymer or silicone rubber material 21 defines the micro-scale supporting post 16 and of the micros-scale features 15 and the backing layer.

Figure 28:
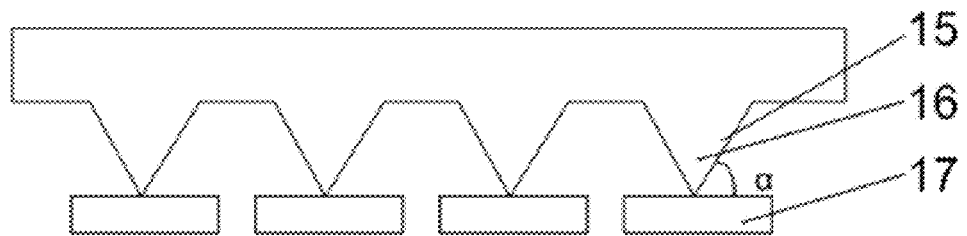
FIG. 28 is a cross-sectional view of the present invention illustrating an alternative embodiment of the present invention.

FIG. 28 illustrates yet another embodiment of the cross-section of the present invention where any of the material compositions or combinations shown in FIG. 9 through 27 may be used to form the cross-section of the structures shown with the micro-scale structures 15 composed of a triangular cross-sectioned supporting post 16 and an overhanging cap 17. The angle of the caps with respect to the micro- or nano-scale supporting structure may be at any angle or combination of angles to the supporting structure as defined by α.

Figure 29:
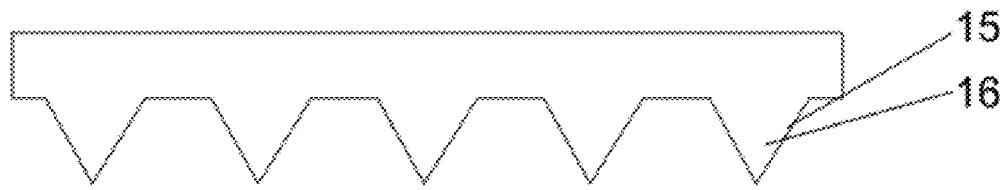
FIG. 29 is a cross-sectional view of the present invention illustrating an alternative embodiment of the present invention.

FIG. 29 illustrates yet another embodiment of the cross-section of the present invention where any of the material compositions or combinations shown in FIG. 9 through 27 may be used to fabricate the cross-section of the structures shown with the micro-scale structures 15 composed of a triangular cross-sectioned supporting post 16.

Figure 30:
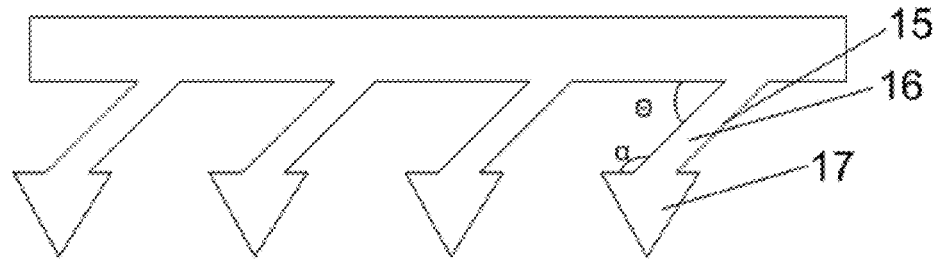
FIG. 30 is a cross-sectional view of the present invention illustrating an alternative embodiment of the present invention.

FIG. 30 illustrates yet another embodiment of the cross-section of the present invention where any of the material compositions, combinations or device configurations shown in FIG. 9 through 27 may be used to form the cross-section of the micro-scale 15 or nano-scale structures. The angle of the overhanging cap 17, which is triangular in cross section, with respect to the micro-scale 15 or nano-scale supporting post 16 may be at any angle with respect to the supporting post 16 as defined by α. Similarly the angle, shown by θ, of the supporting post 16 with respect to the backing layer may be at any angle or combination of angles from 0 to 180 degrees.

Figure 31:
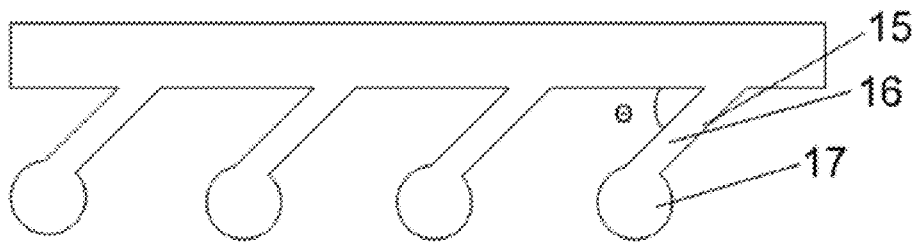
FIG. 31 is a cross-sectional view of the present invention illustrating an alternative embodiment of the present invention.

FIG. 31 illustrates yet another embodiment of the cross-section of the present invention where any of the material compositions, combinations or device configurations shown in FIG. 9 through 27 may be used to form the cross-section of the micro-scale 15 or nano-scale structures. The angle of the supporting post 16 with respect to the backing layer as given by θ, may be at any angle or combination of angles from 0 to 180 degrees. The overhanging cap 17 in this case is composted of spherical structures, with radis r.

Figure 32:
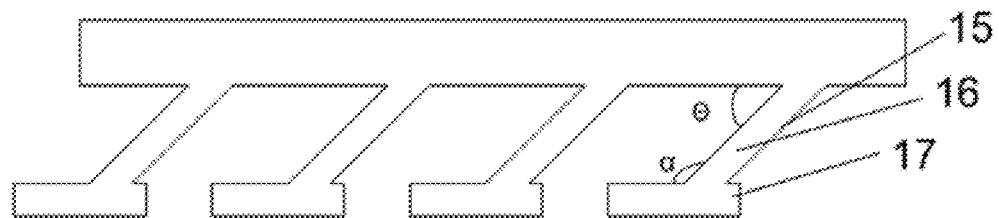
FIG. 32 is a cross-sectional view of the present invention illustrating an alternative embodiment of the present invention.

FIG. 32 illustrates yet another embodiment of the cross-section of the present invention where any of the material compositions or combinations shown in FIG. 9 through 27 may be used to form the cross-section of the micro-scale 15 or nano-scale structure. The angle of the overhanging caps 17 with respect to the micro- or nano-scale supporting post 16 may be at any angle with respect to the supporting structure as defined by α. Similarly the angle, shown by θ, of the supporting post 16 to the backing layer may be at any angle or combination of angles from 0 to 180 degrees.

Figure 33:
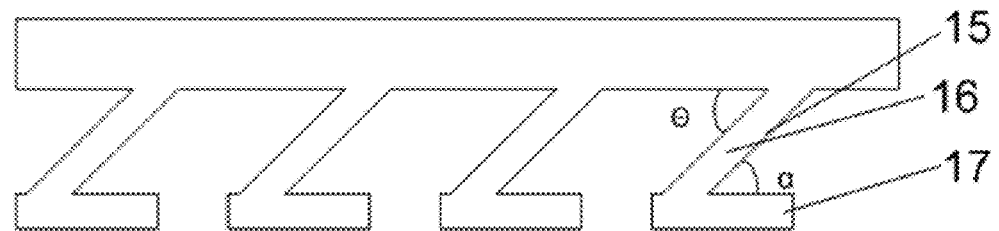
FIG. 33 is a cross-sectional view of the present invention illustrating an alternative embodiment of the present invention.

FIG. 33 illustrates yet another embodiment of the cross-section of the present invention where any of the material compositions or combinations shown in FIG. 9 through 27 may be used to form the cross-section of the micro-scale 15 or nano-scale structure. The angle of the overhanging caps 17 with respect to the micro- or nano-scale supporting post 16 may be at any angle with respect to the supporting post 16 as defined by α. Similarly the angle, shown by θ, of the supporting post 16 to the backing layer may be at any angle or combination of angles from 0 to 180 degrees.

Figure 34:
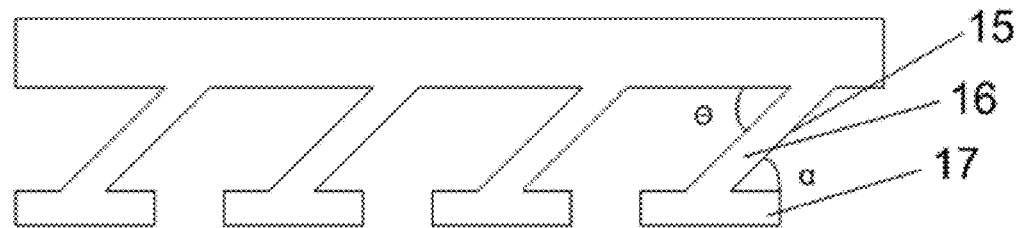
FIG. 34 is a cross-sectional view of the present invention illustrating an alternative embodiment of the present invention.

FIG. 34 illustrates yet another embodiment of the cross-section of the present invention where any of the material compositions or combinations shown in FIG. 9 through 27 may be used to form the cross-section of the micro-scale 15 or nano-scale structure. The angle of the overhanging caps 17 with respect to the micro- or nano-scale supporting posts 16 may be at any angle with respect to the supporting structure as defined by α. Similarly the angle, shown by θ, of the supporting post 16 to the backing layer may be at any angle or combination of angles from 0 to 180 degrees.

Figure 35:
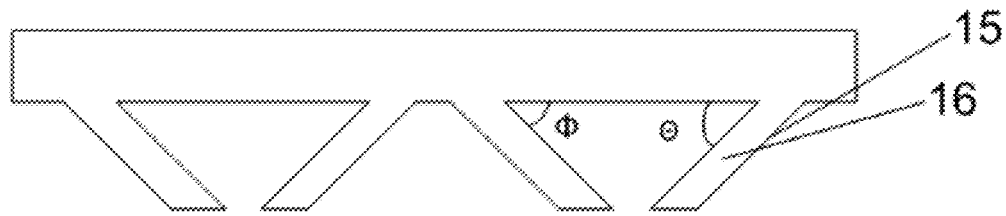
FIG. 35 is a cross-sectional view of the present invention illustrating an alternative embodiment of the present invention.

FIG. 35 illustrates yet another embodiment of the cross-section of the present invention where any of the material compositions or combinations shown in FIG. 9 through 27 may be used to form the cross-section of the micro-scale 15 or nano-scale structure. The angles, shown by θ and Φ, of the supporting posts 16 with respect to the backing layer may be at any angle or combination of angles from 0 to 180 degrees.

Figure 36:
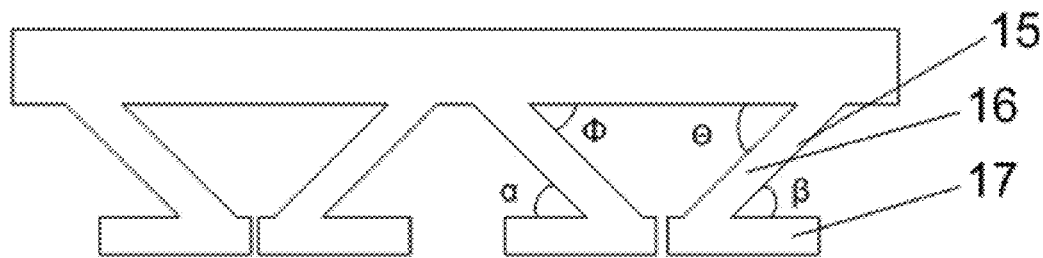
FIG. 36 is a cross-sectional view of the present invention illustrating an alternative embodiment of the present invention.

FIG. 36 illustrates yet another embodiment of the cross-section of the present invention where any of the material compositions or combinations shown in FIG. 9 through 27 may be used to form the cross-section of the micro-scale 15 or nano-scale structure. The angles, shown by θ and Φ, of the supporting posts 16 with respect to the backing layer may be at any angle or combination of angles from 0 to 180 degrees. Similarly, the angles, α and β, of the overhanging caps 17 with respect to the supporting posts 16 may be at any angle or combination of angles from 0 to 180 degrees.

Figure 37:
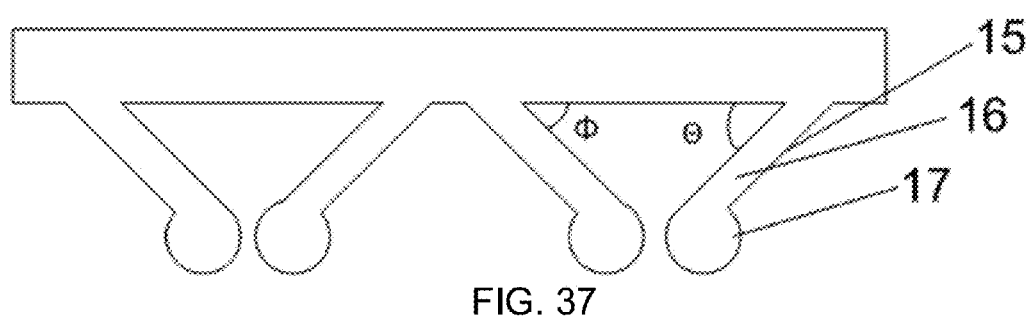
FIG. 37 is a cross-sectional view of the present invention illustrating an alternative embodiment of the present invention.

FIG. 37 illustrates yet another embodiment of the cross-section of the present invention where any of the material compositions, combinations or device configurations shown in FIG. 9 through 27 may be used to form the cross-section of the micro-scale 15 or nano-scale structure. The angles, shown by θ and Φ, of the supporting posts 16 with respect to the backing layer may be at any angle or combination of angles from 0 to 180 degrees. In this embodiment, the overhanging cap 17 is formed of spherical structures, with radius r.

Figure 38:
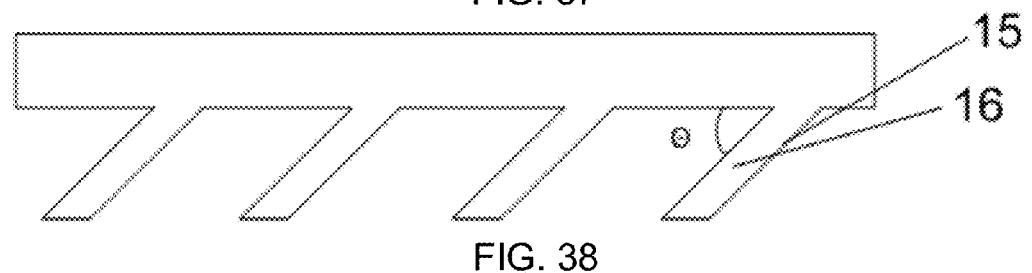
FIG. 38 is a cross-sectional view of the present invention illustrating an alternative embodiment of the present invention.

FIG. 38 illustrates yet another embodiment of the cross-section of the present invention where any of the material compositions or combinations shown in FIG. 9 through 27 may be used to form the cross-section of the micro-scale 15 or nano-scale structure. The angle of the supporting post 16, shown by θ, of the supporting post 16 with respect to backing layer may be at any angle or combination of angles from 0 to 180 degrees.

Figure 39:
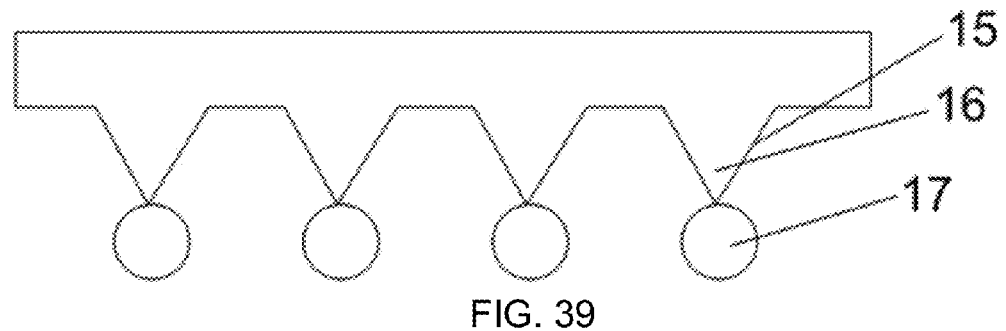
FIG. 39 is a cross-sectional view of the present invention illustrating an alternative embodiment of the present invention.

FIG. 39 illustrates yet another embodiment of the cross-section of the present invention where any of the material compositions or combinations shown in FIG. 9 through 27 may be used to form the cross-section of the micro-scale 15 or nano-scale structure. In this case the supporting posts 16 are triangular in cross-section and the micro-scale or nano-scale overhanging caps 17 are circular in cross-section with radius r.

Figure 40:
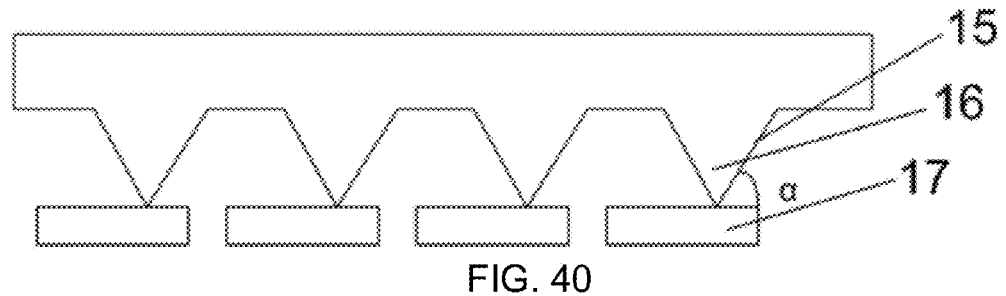
FIG. 40 is a cross-sectional view of the present invention illustrating an alternative embodiment of the present invention.

FIG. 40 illustrates yet another embodiment of the cross-section of the present invention where any of the material compositions or combinations shown in FIG. 9 through 27 may be used to form the cross-section of the micro-scale 15 or nano-scale structure. In this case the supporting posts 16 are triangular in cross-section and the angle of the overhanging caps 17 with respect to the micro- or nano-scale supporting post 16 may be at any angle or combination of angles to the supporting post 16 as defined by α.

Figure 41:
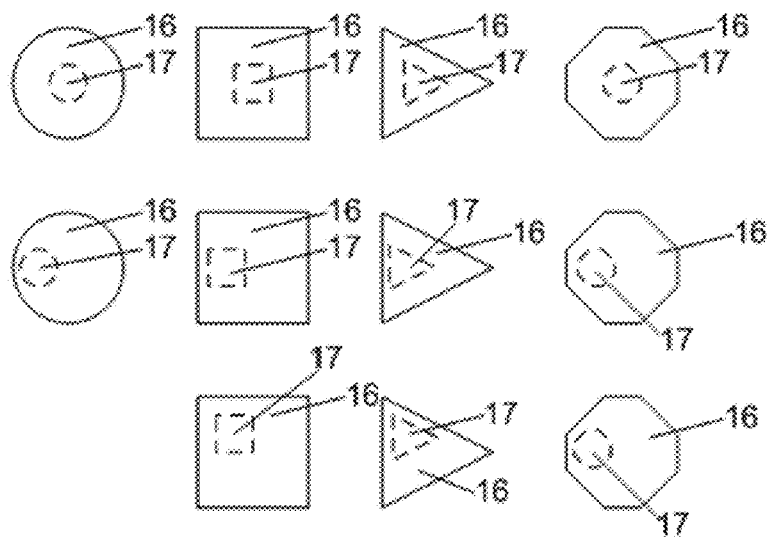
FIG. 41 is a top view of the present invention illustrating a cap and post arrangement.

FIG. 41 illustrates an end-on view of the overhanging cap 17 and the relative placement of the supporting post 16 in common configurations of the present invention nano-scale or micro-scale structures shown previously in cross-sectional view in FIGS. 9 through 40.

Figure 42:
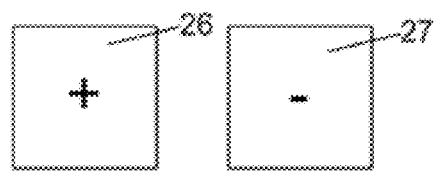
FIG. 42 illustrates a first electrode arrangement of the present invention.

FIG. 42 illustrates one possible configuration of the positive 26 and negative 27 electrodes for any of the present inventions previously shown in FIG. 9 through 40. While one possible electrode configuration is shown in FIG. 42, the positive 26 and negative 27 electrodes are interchangeable.

Figure 43:
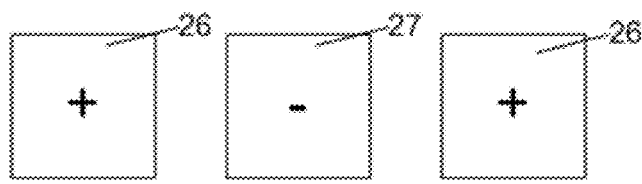
FIG. 43 illustrates an alternative electrode arrangement of the present invention according to an alternative embodiment.
Figure 43:
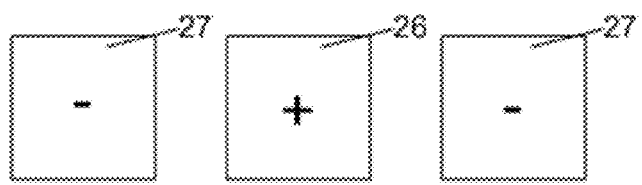
Figure 43:
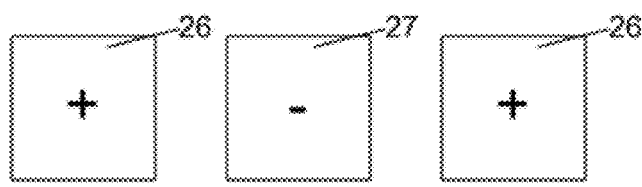

FIG. 43 illustrates yet another possible configuration of the positive 26 and negative 27 electrodes for any of the present inventions previously shown in FIG. 9 through 40. While one possible electrode configuration is shown in FIG. 43, the positive 26 and negative 27 electrodes are interchangeable.

Figure 44:
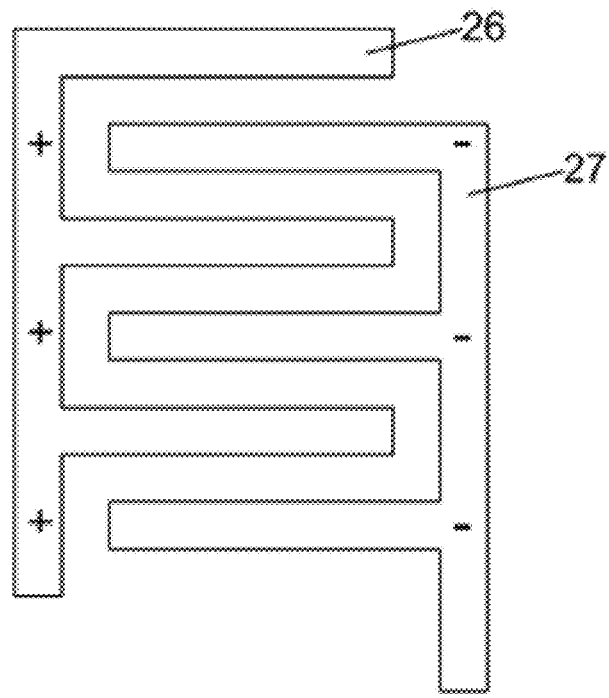
FIG. 44 illustrates an alternative electrode arrangement of the present invention according to an alternative embodiment.

FIG. 44 illustrates yet another possible configuration of the positive 26 and negative 27 electrodes for any of the present inventions previously shown in FIG. 9 through 40. While one possible electrode configuration is shown in FIG. 44, the positive 26 and negative 27 electrodes are interchangeable.

Figure 45:
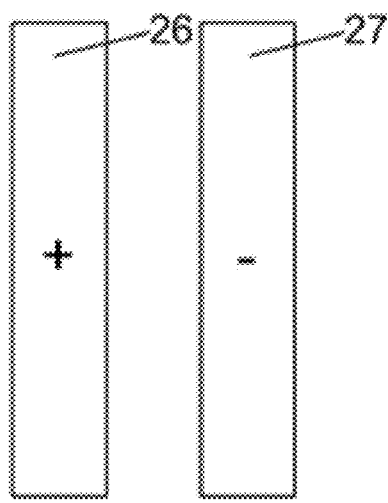
FIG. 45 illustrates an alternative electrode arrangement of the present invention according to an alternative embodiment.

FIG. 45 illustrates yet another possible configuration of the positive 26 and negative 27 electrodes for any of the present inventions previously shown in FIG. 9 through 40. While one possible electrode configuration is shown in FIG. 45, the positive 26 and negative 27 electrodes are interchangeable.

Figure 46:
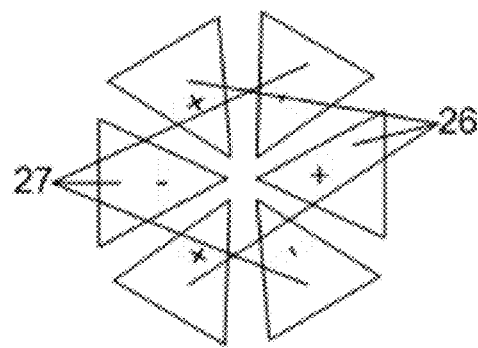
FIG. 46 illustrates an alternative electrode arrangement of the present invention according to an alternative embodiment.

FIG. 46 illustrates yet another possible configuration of the positive 26 and negative 27 electrodes for any of the present inventions previously shown in FIG. 9 through 40. While one possible electrode configuration is shown in FIG. 46, the positive 26 and negative 27 electrodes are interchangeable.

Figure 47:
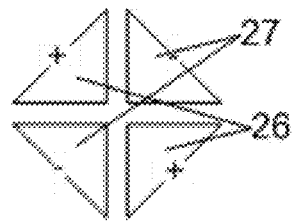
FIG. 47 illustrates an alternative electrode arrangement of the present invention according to an alternative embodiment.

FIG. 47 illustrates yet another possible configuration of the positive 26 and negative 27 electrodes for any of the present inventions previously shown in FIG. 9 through 40. While one possible electrode configuration is shown in FIG. 47, the positive 26 and negative 27 electrodes are interchangeable.

Figure 48:
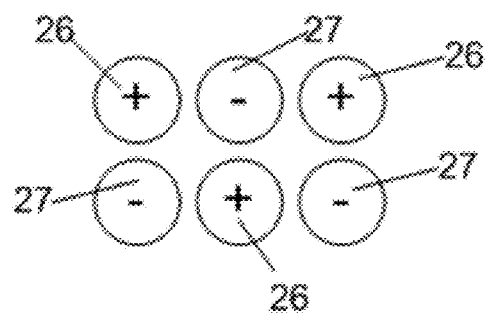
FIG. 48 illustrates an alternative electrode arrangement of the present invention according to an alternative embodiment.

FIG. 48 illustrates yet another possible configuration of the positive 26 and negative 27 electrodes for any of the present inventions previously shown in FIG. 9 through 40. While one possible electrode configuration is shown in FIG. 48, the positive 26 and negative 27 electrodes are interchangeable.

Figure 49:
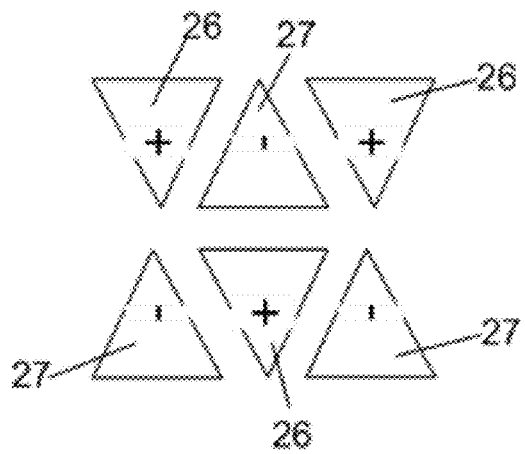
FIG. 49 illustrates an alternative electrode arrangement of the present invention according to an alternative embodiment.

FIG. 49 illustrates yet another possible configuration of the positive 26 and negative 27 electrodes for any of the present inventions previously shown in FIG. 9 through 40. While one possible electrode configuration is shown in FIG. 49, the positive 26 and negative 27 electrodes are interchangeable.

Figure 50:
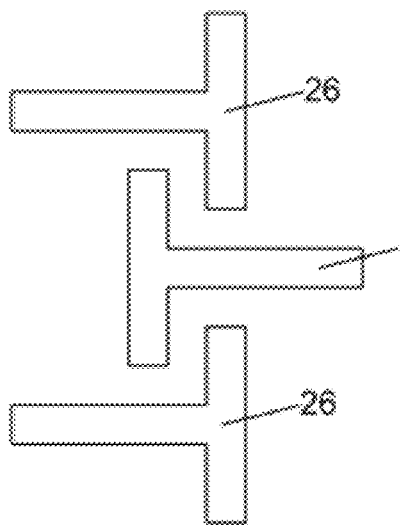
FIG. 50 illustrates an alternative electrode arrangement of the present invention according to an alternative embodiment.

FIG. 50 illustrates yet another possible configuration of the positive 26 and negative 27 electrodes for any of the present inventions preciously shown in FIG. 9 through 40. While one possible electrode configuration is shown in FIG. 50, the positive 26 and negative 27 electrodes are interchangeable.

Figure 51:
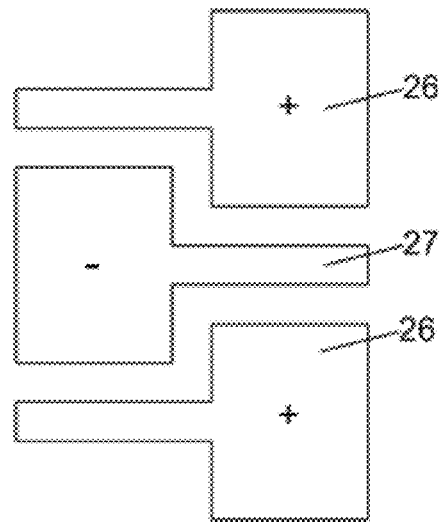
FIG. 51 illustrates an alternative electrode arrangement of the present invention according to an alternative embodiment.

FIG. 51 illustrates yet another possible configuration of the positive 26 and negative 27 electrodes for any of the present inventions previously shown in FIG. 9 through 40. While one possible electrode configuration is shown in FIG. 51, the positive 26 and negative 27 electrodes are interchangeable.

Figure 52:
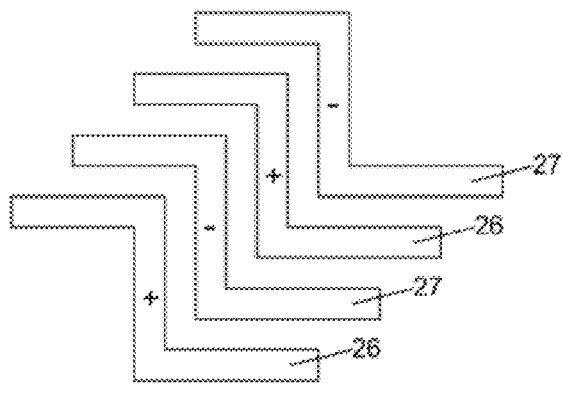
FIG. 52 illustrates an alternative electrode arrangement of the present invention according to an alternative embodiment.

FIG. 52 illustrates yet another possible configuration of the positive 26 and negative 27 electrodes for any of the present inventions previously shown in FIG. 9 through 40. While one possible electrode configuration is shown in FIG. 52, the positive 26 and negative 27 electrodes are interchangeable.

Figure 53:
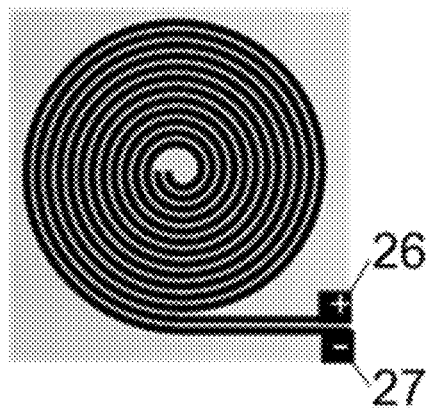
FIG. 53 illustrates an alternative electrode arrangement of the present invention according to an alternative embodiment.

FIG. 53 illustrates yet another possible configuration of the positive 26 and negative 27 electrodes for any of the present inventions previously shown in FIG. 9 through 40. While one possible electrode configuration is shown in FIG. 53, the positive 26 and negative 27 electrodes are interchangeable.

FIG. 54 illustrates yet another possible configuration of the positive 26 and negative 27 electrodes for any of the present inventions previously shown in FIG. 9 through 40. While one possible electrode configuration is shown in FIG. 54, the positive 26 and negative 27 electrodes are interchangeable.

FIG. 55 illustrates yet another possible configuration of the positive 26 and negative 27 electrodes for any of the present inventions previously shown in FIG. 9 through 40. While one possible electrode configuration is shown in FIG. 55, the positive 26 and negative 27 electrodes are interchangeable.

FIG. 56 illustrates yet another possible configuration of the positive 26 and negative 27 electrodes for any of the present inventions previously shown in FIG. 9 through 40. While one possible electrode configuration is shown in FIG. 56, the positive 26 and negative 27 electrodes are interchangeable.

FIG. 57 illustrates another embodiment of the present invention where instead of using a planar sheet of electro-dry-adhesive, the present invention is formed into a circular cross-section with outer radius, R, and inner radius, r, where $0 \leq r \leq R$ and where R is greater than 1 mm. The present invention with micro- or nano-scale structures 15 composed of supporting posts 16 and overhanging caps 17, although only shown in one cross-sectional configuration, can be implemented in any of the configurations previously illustrated in FIGS. 9 through 40.

Figure 58:
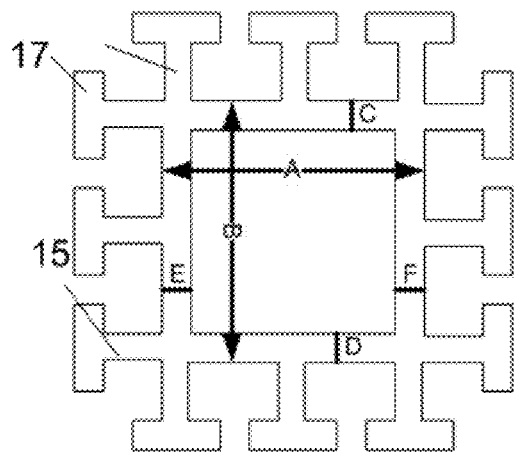
FIG. 58 is a cross-sectional view of the present invention illustrating an outward square embodiment.

FIG. 58 illustrates yet another embodiment of the present invention where instead of using a planar sheet of electro-dry-adhesive, the present invention is formed in a square (shown) or polygonal cross-section with outer dimensions A and B being greater than 1 mm and side wall thicknesses, C and D ranging from 1 µm to one half of the length of B. Side wall thicknesses, E and F, range from as small as 1 µm to one half of the length of A. The present invention with micro- or nano-scale structures 15 composed of supporting posts 16 and overhanging caps 17, although only shown in one cross-sectional configuration, can be implemented in any of the configurations or materials combinations previously illustrated in FIGS. 9 through 40.

Figure 59:
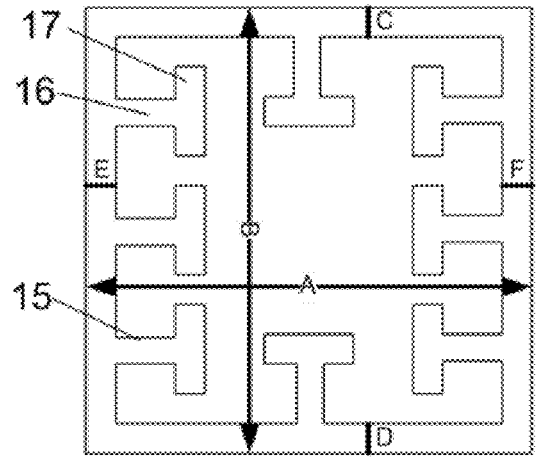
FIG. 59 is a cross-sectional view of the present invention illustrating an inward square embodiment.

FIG. 59 illustrates yet another embodiment of the present invention where instead of using a planar sheet of electro-dry-adhesive, the present invention is formed in a square or tubular cross-section with outer dimensions A and B being greater than 1 mm. The wall thicknesses, C and D, may range from 1 µm to one half of the length of B. Side wall thicknesses, E and F, range from as small as 1 µm to one half of the length of A. The present invention with micro- or nano-scale structures 15 composed of supporting posts 16 and overhanging caps 17, although only shown in one cross-sectional configuration, can be implemented in any of the configurations or materials combinations previously illustrated in FIGS. 9 through 40.

Figure 60:
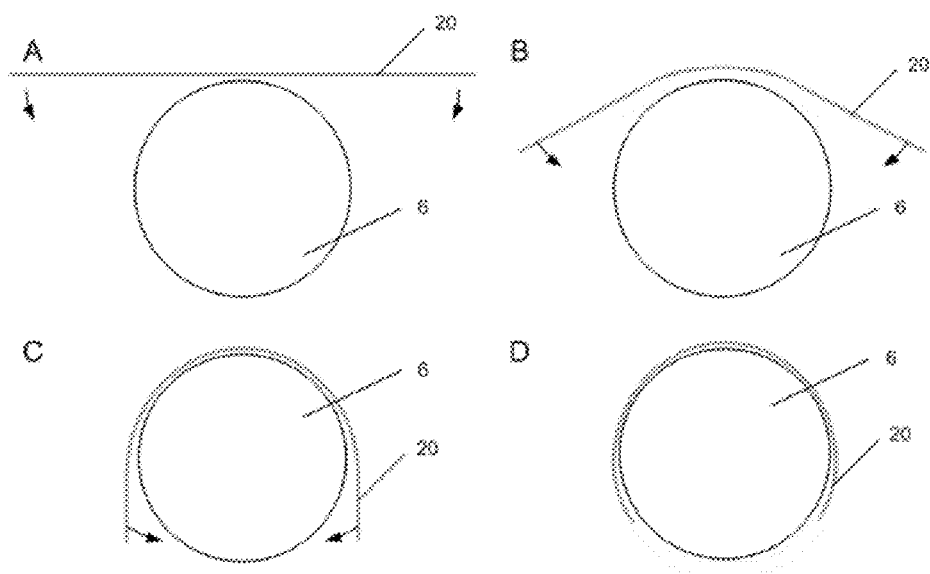
FIG. 60 is a cross-sectional view of the present invention illustrating the electrostatic preloading force.

FIG. 60 illustrates a compliant electro-dry-adhesive sheet 20 in cross-section self-complying to a macro-scale round substrate 6 also shown only in cross-section. A. The present invention 20 is placed near the surface of the round substrate 6. B. After applying a voltage to the electrodes on the present invention 20 the generated attractive electrostatic force between the present invention 20 and the round substrate 6 is such that the compliant electro-dry-adhesive 20 is bent towards the surface of the round object. As the present invention 20 continues to be bent into compliant contact with the round substrate 6 as shown in C, the compliant electro-dry-adhesive sheet 20 is in conformal contact with the macro-scale round object as shown in D. For clarity, the micro- and nano-scale structures are not shown and a relatively large gap is shown between the macro-scale round substrate 6 and the present invention 2. In reality, the electrostatic force is such that it self-preloads the present invention micro-scale structures into the close contact required for van der Waals interactions to occur.

In the preferred embodiment of the present invention, a 4" diameter polymethyl methacrylate (PMMA) substrate is first rinsed under de-ionized (DI) water. After first drying with compressed $N_2$ gas, the PMMA is placed in a thermal chamber at 100° C. for 1 minute to thoroughly dry the PMMA surface. Polymethylglutarimide (PMGI 19, Micro-Chem) is thinned 3:1 by weight with T-Thinner and is spin-coated onto the PMMA substrate at 2500 RPM for 30 seconds to obtain a 2.3 µm thick layer. Following a 100° C. soft bake for 2 minutes in a thermal chamber, a second photoresist layer (AZ9260 is spin coated at 3000 RPM for 30 seconds. Following a 1 hour bake at 80° C., the PMMA substrate with photoresist layers is subjected to 100° C. for 90 seconds within a thermal chamber. After allowing the photoresist layers to re-hydrate for 30 minutes in DI water, the photoresist layers are exposed to i-line UV light for a suitable period of time with a suitable mask defining the desired features. After UV exposure the PMMA substrate and photoresist layers are placed in developer solution (AZ 400K 1:4 DI water) in order to develop the micro-scale features. After the desired structure has been achieved, the photoresist and PMMA substrate are immediately rinsed with DI water and allowed to air dry for at least 1 hour prior to being used as a mold substrate.

PDMS is first mixed in a 10:1 ratio of prepolymer to curing agent and then 24% carbon black particles by weight are carefully mixed into the PDMS. After thoroughly mixing the PDMS and carbon black mixture (CB-PDMS), the CB-PDMS is spread over the surface of a prefabricated mold which defines the desired surface. After achieving the desired backing layer thickness, aluminum strips are placed on the CB-PDMS and then the mold, CB-PDMS and aluminum are placed in a thermal chamber and cured at 80° C. for 3 hours to cure the CB-PDMS. After the CB-PDMS has cured, it is removed from the mold and the present invention is ready for use. The manufacturing process is illustrated in FIG. 5.

The above method can be modified accordingly to further satisfy individual requirements. First, an increased percentage of carbon black by weight results in CB-PDMS with increased conductivity. It may be necessary to use a PDMS thinner such as Toluene or Hexane in order to achieve thorough mixing with CB concentrations greater than 25%. Alternating layers of CB-PDMS and PDMS may be used to suitably create alternating conductive and non-conductive layers. It may be desirable to spin coat a thin layer of PDMS onto the mold substrate before applying a layer of CB-PDMS in order to ensure that the microstructures are composed of only PDMS. The PDMS layer may be cured prior to the application of the CB-PDMS layer. Also, a metallic layer may be used to increase conductivity. Lastly, the metallic layer may be used to define the electrodes.

While the above description contains specific details regarding certain elements, sizes, and other teaching, it is understood that embodiments of the invention or any combination of them may be practiced without these specific details. Specifically, although certain materials are designated in the above embodiments, any suitable materials may be used. These details should not be construed as limitations on the scope of any embodiment, but merely as exemplifications of the presently preferred embodiments. In other instances, well known structures, elements, and techniques have not been shown to clearly explain the details of the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An apparatus for electro-dry adhesion comprising:
    a deformable substrate, said deformable substrate further comprising a composite polymer, rubber, or silicon rubber material with embedded conductive particles, wherein said conductive particles provide conductivity to said deformable substrate;
    a micro-featured surface configured to provide dry adhesion; and
    at least one conductive material configured to provide electrostatic adhesion and at least one non-conductive region configured to isolate said conductive material, further comprising a voltage applied to said at least one conductive material providing an attractive force to self-preload said micro-featured surface, a resistive force to self-peel said micro-featured surface, or alternating said voltage to self-clean said micro-featured surface.

2. The apparatus of claim 1, further comprising one or a plurality of insulating layers having a dielectric constant configured to define said micro-featured surface, said insulating layer further comprising an insulating polymer, composite polymer, rubber, or silicone rubber.

3. The apparatus of claim 1, wherein said deformable substrate and conductive material are combined, wherein said deformable substrate further comprises a conductive polymer, rubber, or silicone rubber.

4. The apparatus of claim 1, wherein said conductive material further comprises carbon black, carbon nanotubes, or silver particles.

5. The apparatus of claim 1, wherein said micro-featured surface further comprises a plurality of posts and caps.

6. The apparatus of claim 5, wherein said micro-featured surface further comprises one or a plurality of recursive nano-featured surfaces further comprising a plurality of posts and caps.

7. The apparatus of claim 6, wherein said micro-featured and nano-featured surfaces further comprise embedded conductive particles, wherein said conductive particles provide conductivity to said micro-featured and nano-featured surfaces.

8. The apparatus of claim 6, wherein said plurality of posts are angled.

9. The apparatus of claim 1, wherein said conductive material further comprises one or a plurality of electrodes comprising an electrically conductive metallic material or an electrically conductive polymer, rubber, or silicone rubber.

10. The apparatus of claim 1, wherein said voltage applied to said at least one conductive material providing an attractive force to self-preload said micro-featured surface, a resistive force to self-peel said micro-featured surface, or alternating said voltage to self-clean said micro-featured surface further comprises applying a voltage of at least 500V across said one or a plurality of electrodes.

* * * * *